(12) United States Patent
Yucra Rodriguez et al.

(10) Patent No.: US 12,021,995 B2
(45) Date of Patent: Jun. 25, 2024

(54) SYSTEMS AND METHODS FOR SELECTIVELY DECRYPTING AN ENCRYPTED CODE USING AUGMENTED REALITY

(71) Applicant: Capital One Services, LLC, McLean, VA (US)

(72) Inventors: Jonatan Yucra Rodriguez, San Francisco, CA (US); Sahil Verma, San Francisco, CA (US); Jonathan Guan, Cupertino, CA (US); Jennifer Chu, San Francisco, CA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 529 days.

(21) Appl. No.: 17/219,648

(22) Filed: Mar. 31, 2021

(65) Prior Publication Data

US 2022/0321351 A1  Oct. 6, 2022

(51) Int. Cl.
*H04L 9/32* (2006.01)
*G06K 7/14* (2006.01)
(Continued)

(52) U.S. Cl.
CPC .......... *H04L 9/3234* (2013.01); *G06K 7/1417* (2013.01); *G06T 19/006* (2013.01); *H04L 51/42* (2022.05); *H04N 1/4486* (2013.01)

(58) Field of Classification Search
CPC ..... H04L 9/3234; H04L 51/42; H04L 9/3226; H04L 51/212; G06K 7/1417;
(Continued)

(56) References Cited

U.S. PATENT DOCUMENTS 9,092,600 B2   7/2015   Scavezze et al.
9,679,144 B2   6/2017   Molnar et al.
(Continued)

FOREIGN PATENT DOCUMENTS

EP   3136275 A1   3/2017

OTHER PUBLICATIONS

International Search Report and Written Opinion in related PCT Application No. PCT/US2022/016206, dated Jun. 10, 2022 (27 pages).

*Primary Examiner* — Trong H Nguyen
(74) *Attorney, Agent, or Firm* — TROUTMAN PEPPER HAMILTON SANDERS LLP; Christopher J. Forstner; John A. Morrissett

(57) ABSTRACT

A system may comprise one or more processors, a memory in communication with the one or more processors, and storing instructions, that when executed by the one or more processors, are configured to cause the system to perform a method for decrypting an encrypted message. The method may include providing an encrypted code to a first user, receiving one or more first images comprising the encrypted code from a first user device associated with the first user. The method may include determining whether the first user device is a trusted device for the encrypted code. The method may include mapping the encrypted code to a first sequence of alphanumeric characters associated with the encrypted code. The method may include providing the first decrypted code comprising the first sequence of alphanumeric characters to the first user device for display in augmented reality proximate the encrypted code.

20 Claims, 6 Drawing Sheets

(51) Int. Cl.
*G06T 19/00* (2011.01)
*H04L 51/42* (2022.01)
*H04N 1/44* (2006.01)

(58) Field of Classification Search
CPC ............ G06T 19/006; G06T 2219/004; H04N 1/4486; G09C 5/00
See application file for complete search history.

(56) References Cited

U.S. PATENT DOCUMENTS

| | | |
|---|---|---|
| 9,726,896 B2 | 8/2017 | von und zu Liechtenstein |
| 9,792,594 B1 | 10/2017 | Bayha et al. |
| 2003/0123700 A1 | 7/2003 | Wakao |
| 2005/0169496 A1 | 8/2005 | Perry |
| 2012/0115513 A1 | 5/2012 | Han |
| 2012/0275726 A1 | 11/2012 | Queck et al. |
| 2012/0306920 A1 | 12/2012 | Bathiche et al. |
| 2016/0110560 A1* | 4/2016 | Forte ................. H04L 9/0822 713/171 |
| 2016/0171357 A1 | 6/2016 | Kwon et al. |
| 2018/0020492 A1* | 1/2018 | Dao .................. H04L 41/0806 |
| 2018/0167215 A1* | 6/2018 | Melzer .................. G06F 3/14 |
| 2019/0012756 A1 | 1/2019 | Han et al. |
| 2019/0188917 A1* | 6/2019 | Cho ..................... G06T 15/506 |
| 2019/0198161 A1 | 6/2019 | Lee et al. |
| 2020/0143024 A1* | 5/2020 | Petkovich ............... G06F 21/84 |
| 2020/0258428 A1* | 8/2020 | Forte ..................... H04L 9/50 |
| 2020/0349296 A1* | 11/2020 | Young .................... G09C 5/00 |
| 2020/0412537 A1 | 12/2020 | Melzer |
| 2021/0004802 A1 | 1/2021 | Rule |
| 2021/0073543 A1 | 3/2021 | Herzberg et al. |
| 2021/0182437 A1 | 6/2021 | Satpathy et al. |
| 2022/0027592 A1* | 1/2022 | Ringuette ............. H04L 9/3213 |

\* cited by examiner

SYSTEMS AND METHODS FOR SELECTIVELY DECRYPTING AN ENCRYPTED CODE USING AUGMENTED REALITY

FIELD OF INVENTION

The disclosed technology generally relates to augmented reality-based systems and methods for decrypting an encrypted code, and more particularly to augmented reality-based systems and methods for decrypting an encrypted code displayed via either virtual or printed content.

BACKGROUND

Accessing and viewing sensitive or private content (e.g., confidential information) may be challenging when users find themselves in public areas. For example, users may find themselves in a coffee shop or office setting when trying to access this type of content via a user device (e.g., laptop, mobile phone, etc.). Others may be in close proximity to a user, and thus a user may struggle to view and consume this type of sensitive information in a discreet fashion. Users may be able to maintain some level of privacy by using existing physical privacy filters that can be added to device screens. While helpful, these privacy screens do not protect sensitive content if others are looking straight at them, nor do they work with printed items (e.g., paper receipts).

Accordingly, there is a need for systems and methods for allowing a user to access and consume sensitive content that provide improved privacy and security. Examples of the present disclosure are directed to these and other considerations.

SUMMARY

The disclosed technology includes systems and methods for selectively decrypting an encrypted code using augmented reality.

Consistent with the disclosed embodiments, a system may include one or more processors and a memory in communication with the one or more processors and storing instructions, that when executed by the one or more processors, are configured to cause the system to perform a method for decrypting an encrypted message. For example, the system (e.g., a merchant system providing decryption) may provide (e.g., in printed or electronic form) an encrypted code (e.g., QR code) to a first user (e.g., laptop, merchant display terminal, etc.). The system, via a first user device (e.g., augmented reality glasses, mobile phone, etc.) associated with the first user, may receive one or more first images comprising the encrypted code. In response, the system may map the encrypted code to a first sequence of alphanumeric characters associated with the code and provide a first decrypted code (e.g., username, account information, etc.) with the first sequence of alphanumeric characters to the first user device for display in augmented reality proximate the encrypted code. The system may provide the first decrypted code to the first user device via a visual output (e.g., electronic display screen), audio output (e.g., speakers), or audiovisual output (e.g., electronic display screen and speakers).

Many embodiments provide the benefit of added security. Some such embodiments enable the system to provide the encrypted code via different types of devices and mediums. These embodiments allow the first user to access sensitive information regardless of the first user's location. For example, the system may provide the encrypted code to the first user by directing a printer proximate the first user to print the encrypted code on a physical medium (e.g., paper receipt). In another example, the system may provide the encrypted code to the first user on an electronic display (e.g., mobile application, web browser, etc.) proximate the first user. In yet another example, the system may provide the encrypted code to the first user at a merchant point-of-sale (POS) (e.g., display terminal, ATM, etc.) proximate the first user. These embodiments thus allow a first user to access sensitive information when the first user is, for example, standing in a store checkout line, sitting in a coffee shop, standing at an ATM, etc.

Another such embodiment provides the benefit of added security by authenticating a specific user device to ensure that user device is permitted to access certain sensitive information. For example, the system may determine whether the first user device is a trusted device for the encrypted code. Responsive to determining that the first user device is a trusted device, the system may map the encrypted code to a first sequence of alphanumeric characters associated with the code. The system may then provide a first decrypted code including the first sequence of alphanumeric characters to the first user device for display in augmented reality proximate the encrypted code. This embodiment helps to ensure unauthorized user devices are not able to access sensitive information.

Still another such embodiment provides the benefit of added security by only providing the first decrypted code when the system recognizes the first user is viewing the encrypted code. For example, the system may display the first sequence of alphanumeric characters proximate the encrypted code such that the first decrypted code is only viewable on the first user device when the first user device is simultaneously capturing one or more second images comprising the encrypted code. This embodiment helps to ensure the system only provides the first decrypted code when the first user is, for example, looking at his or her laptop screen, the merchant display terminal, etc., as opposed to providing the decrypted code when an unauthorized user may be looking in that direction.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology, and, together with the description, serve to explain the principles of the disclosed technology. In the drawings.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed devices and methods. Such other components not described herein may include, but are not limited to, for example, components developed after development of the disclosed technology.

By way of introduction, aspects discussed herein may relate to augmented reality-based systems and methods for selectively decrypting an encrypted code. As a starting point, a user must have some type of account with a merchant or other entity. This account could be, for example, a shopping account through an online store, a financial account with a financial institution, a medical online portal account with a medical practice, and the like. Once a user has an established account, the user may also register or authenticate a user device to use when accessing such established account. For example, a user may register his or her laptop or mobile smart phone in order to navigate to the merchant or entity's webpage to log into the user's established account for increased security and/or convenience in future login attempts. Many different techniques for registering a user device are contemplated. For example, a user may acquire a unique username and password, a unique private key, a merchant-specific public key, a user device IP address, a QR code with a machine-readable microdot comprising a public key, etc. When the user attempts to access the user's established account, the merchant or entity overseeing that account may then identify the user device as a trusted user device by comparing the credentials (e.g., username and password, private key, public key, etc.) of the user device to those credentials the entity previously stored or associated with that user device.

Once a user device has been identified as a trusted user device, the user device may be used as a component within augmented reality-based systems and methods for decrypting an encrypted code. As such, the following discussion provides techniques for enabling a user to selectively reveal some or all of the sensitive or confidential information contained on a virtual display (e.g., electronic screen) or physical printout (e.g., paper receipt). Augmented reality-based systems and methods may provide advantages over other techniques by improving security of sensitive information to help prevent bystanders or unauthorized persons from viewing it.

Figure 1:
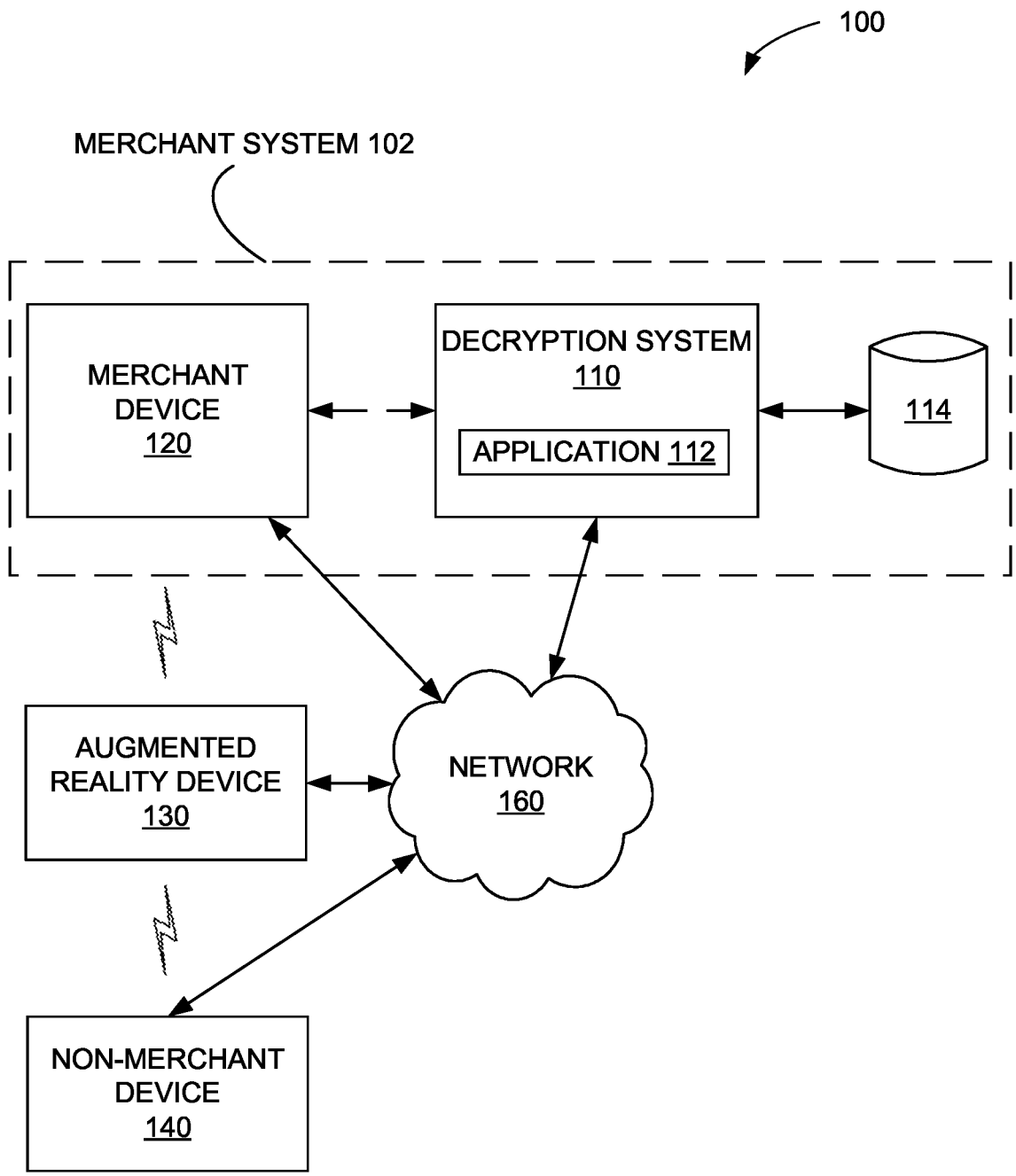
FIG. 1 is a diagram of an exemplary system that may be used to facilitate an augmented reality experience to decrypt an encrypted code in accordance with some embodiments.

Oftentimes, there are several components at work when decrypting an encrypted code using augmented reality-based systems and methods. FIG. 1 shows an exemplary system 100 that illustrates several components that may be found when selectively decrypting an encrypted code via an augmented reality-based system. For example, system 100 may include a merchant system 102, which may include a decryption system 110, a database 114, and a merchant device 120, in communication with an augmented reality device 130 and/or a non-merchant device 140 via a network 160. Additionally, merchant system 102, augmented reality device 130, and/or non-merchant device 140 may be configured to communicate directly via a wireless or wired communication.

Merchant system 102 may be configured to perform one or more steps of a method for selectively decrypting an encrypted code depending on whether an encryption system, included in merchant device 120, is configured internally or externally to merchant system 102. That is, merchant system 102 may be configured to perform both encryption and decryption of sensitive information. In such embodiment, merchant system 102 may include a decryption system 110, database 114, and merchant device 120. Alternatively, merchant system 102 may be configured to perform only decryption of sensitive information. In such embodiment, merchant system 102 may include decryption system 110, and database 114.

Merchant device 120 may be configured to encrypt user sensitive information. That is, merchant device 120 may be configured to replace sensitive information (e.g., user's full name, social security number, account number, etc.) with an encrypted code (e.g., QR code) when displaying such information. Merchant device 120 may be configured to display an encrypted code via either a virtual or physical medium. For example, merchant device 120 may be a merchant POS terminal display that can provide an encrypted code via an electronic display. Merchant device 120 could also be a merchant ATM that can provide an encrypted code via a printed receipt. Merchant device 120 may be configured to perform such encryption automatically (e.g., upon detecting a user logging into a personal account) or based on stored user preferences (e.g., types or categories of information a user deems sensitive).

Decryption system 110 may be configured to decrypt encrypted user sensitive information. That is, decryption system 110 may be configured to receive an encrypted code from a user device, and to map that encrypted code to a series of alphanumeric characters in order to reveal the sensitive information to a user. Decryption system 110 may be capable of executing any application(s) 112 supported by a merchant or entity and available for download on a user device. For example, application 112 may be a mobile application that may be downloaded onto a mobile smart phone to enable a user to interact with decryption system 110. Decryption system 110 may comprise one or more processors and a memory in communication with the one or more processors and instructions configured to cause decryption system 110 to selectively decrypt an encrypted code, as described in further detail below with respect to FIG. 3. An encrypted code may be generated via merchant device 120 as either an internal or external component of merchant system 102. Additionally, decryption system 110 may be configured to communicate directly with database 114, such as via a wired, wireless, secured, and/or unsecured connection.

Database 114 may be configured to store information on behalf of decryption system 110. Information may include, but is not limited to, personal information, account information, and user preferences, collectively sensitive information associated with the user and/or the user's personal accounts. Personal information may include a user's name, address, phone number (i.e., mobile number, home number, business number, etc.), social security number, password, employment information, family information, and any other information that may be used to identify the first user. Account information may include account balances, bill pay information, direct deposit information, wire transfer information, statements, and the like. User preferences may define types of information the user defines as sensitive, whether the user prefers automatic or manual encryption of information, and the like. Database 114 may include, but is not limited to, relational databases, hierarchical databases, distributed databases, in-memory databases, flat file databases, XML databases, NoSQL databases, graph databases, and/or a combination thereof.

Augmented reality device 130 may be any user device capable of displaying information via augmented reality. For example, augmented reality device 130 may include a mobile computing device (e.g., a smart phone, tablet computer, smart wearable device, portable laptop computer, voice command device, or other mobile computing device) or a stationary computing device (e.g., a stationary desktop or other stationary computer). Augmented reality device 130 may belong to or be provided by a consumer, or may be borrowed, rented, or shared. In some embodiments, augmented reality device 130 may be configured to provide an augmented reality experience to one or more users, and may be equipped with a display, speakers or other auditory devices, tactile simulators, haptic sensors, cameras, light projectors, input devices, distance measuring equipment, 3D scanners, IR sensors, microphones, orientation/position/location sensors, accelerometers, and other devices configured to engage the user's senses to enhance the augmented reality experience.

Figure 2:
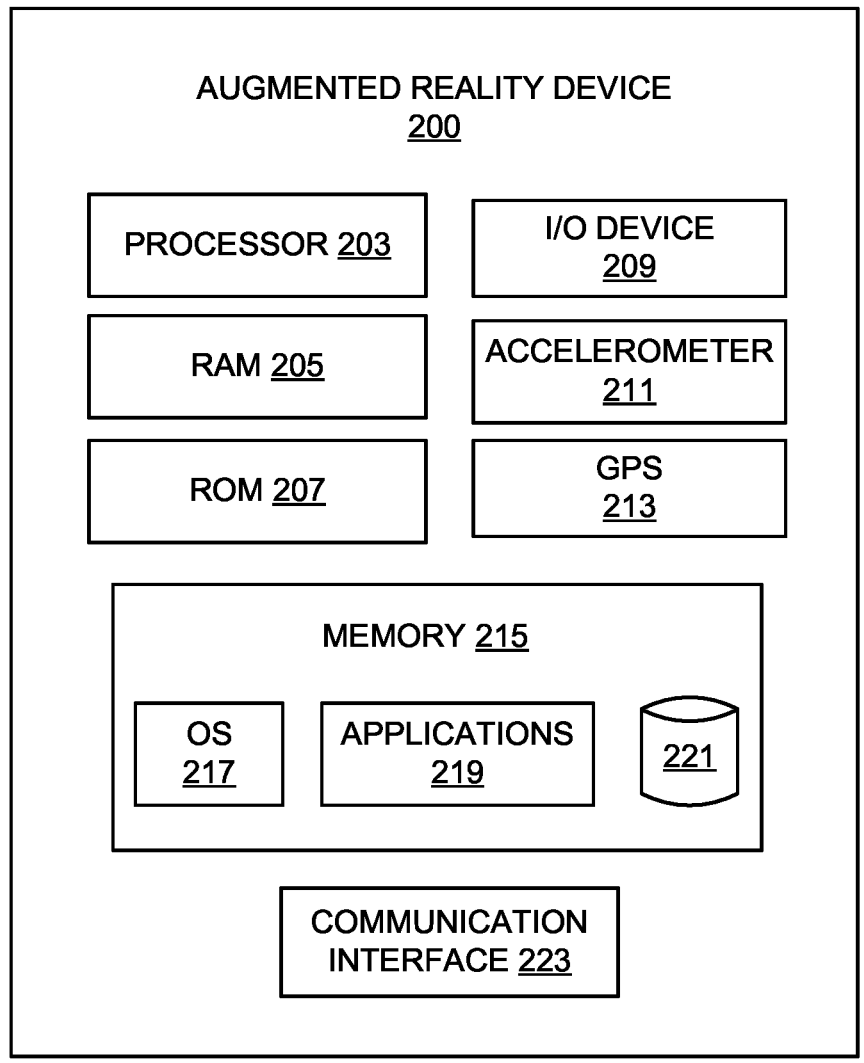
FIG. 2 is a component diagram of an exemplary augmented reality device in accordance with some embodiments.

An exemplary embodiment of augmented reality device 130 is shown in more detail in FIG. 2. As shown, augmented reality device 200 may include processor(s) 203 for controlling overall operation of the augmented reality device 200 and its associated components, including random access memory (RAM) 205, read only memory (ROM) 207, an input/output (I/O) device 209, an accelerometer 211, a global positioning system (GPS) receiver/antenna 213, memory 215, and/or a communication interface 223. A data bus may interconnect processor 203, RAM 205, ROM 207, I/O device 209, accelerometer 211, GPS receiver/antenna 213, memory 215, and/or communication interface 223. In some embodiments, augmented reality device 200 may represent, be incorporated in, and/or include various devices such as a desktop computer, a computer server, a mobile device, such as a laptop computer, a tablet computer, a smart phone, any other types of mobile computing devices, electronic terminals, transactional terminals, and the like, and/or any other type of data processing device.

I/O device 209 may include a microphone, keypad, touch screen, and/or stylus through which a user of the augmented reality device 200 may provide input, and may also include one or more of a speaker for providing audio output and a video display device for providing textual, audiovisual, and/or graphical output. In some embodiments, I/O device 209 may include an image capture device.

Software may be stored within memory 215 to provide instructions to processor 203 allowing augmented reality device 200 to perform various actions. For example, memory 215 may store software used by the augmented reality device 200, such as an operating system (OS) 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, RAM 205, ROM 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Accelerometer 211 may be a sensor configured to measure accelerating forces of augmented reality device 200. Accelerometer 211 may be an electromechanical device. Accelerometer 211 may be used to measure the tilting motion and/or orientation of augmented reality device 200, movement of augmented reality device 200, and/or vibrations of augmented reality device 200. The acceleration forces may be transmitted to the processor to process the acceleration forces and determine the state of augmented reality device 200.

GPS receiver/antenna 213 may be configured to receive one or more signals from one or more global positioning satellites to determine geographic information of augmented reality device 200. The geographic information provided by GPS receiver/antenna 213 may be used for navigation, tracking, and positioning applications. That is, augmented reality device 200 may be configured to provide a GPS signal to merchant device 120. Merchant device 120 may then be configured to detect the provided GPS signal to provide the encrypted code based on user location. For example, merchant device 120 may be configured to provide the encrypted code to the first user by directing a printer proximate the first user to print the encrypted code on a physical medium (e.g., paper receipt). As such, merchant device 120 may be configured to determine the printer proximate the first user by relying on the provided GPS signal. The geographic information provided by GPS receiver/antenna 213 may also be used to indicate places and routes frequented by the first user. For example, merchant device 120 may be configured to detect the provided GPS signal to recognize locations where the first user frequently accesses sensitive information, e.g., ATM locations, merchant POS terminals, coffee shops, etc. Merchant device 120 may then be configured to provide the encrypted code (e.g., automatically or based on stored user preferences) to the first user upon detecting the first user's presence in any such location.

Communication interface 223 may include one or more transceivers, digital signal processors, and/or additional circuitry and software for communicating via any network, wired or wireless, using any protocol as described herein. Communication interface 223 may also include near field communication (NFC) capabilities, short-range wireless communication capabilities (e.g., Bluetooth®), wireless communication capabilities (e.g., Wi-Fi), or any combination thereof.

Processor 203 may include a single central processing unit (CPU), which may be a single-core or multi-core processor, or may include multiple CPUs. Processor 203 and associated components may allow the augmented reality device 200 to execute a series of computer-readable instructions to perform some or all of the processes described herein. Although not shown in FIG. 2, various elements within memory 215 or other components in augmented reality device 200, may include one or more caches, for example, CPU caches used by processor 203, page caches used by operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments and may provide potential advantages in certain implementations of devices, systems, and methods described herein, such as faster response times and less dependence on network conditions when transmitting and receiving data.

Although various components of augmented reality device 200 are described separately, functionality of the various components may be combined and/or performed by a single component and/or multiple computing devices in communication.

Turning back to FIG. 1, non-merchant device 140 may include any type of device outside of merchant system 102, that provides the encrypted code to the first user. For example, a user may be sitting in a public library using his or her laptop computer to log into a personal account administered by a merchant or other entity. The laptop computer, acting as non-merchant device 140, communicates with decryption system 110 to provide the encrypted code displayed on the merchant's website. As an additional example, the user may then print a physical printout (e.g., paper receipt) off the laptop using a public library printer. The public library printer, acting as an additional non-merchant device 140, communicates with decryption system 110 to provide the encrypted code displayed on the physical printout.

Network 160 may include any type of network. In this regard, first network 160 may include the Internet, a local area network (LAN), a wide area network (WAN), a wireless telecommunications network, and/or any other communication network or combination thereof. It will be appreciated that the network connections shown are illustrative and any means of establishing a communications link between devices may be used. The existence of any of various network protocols such as TCP/IP, Ethernet, FTP, HTTP and the like, and of various wireless communication technologies such as GSM, CDMA, Wi-Fi, and LTE, is presumed, and the various computing devices described herein may be configured to communicate using any of these network protocols or technologies. The data transferred to and from various computing devices in system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in system 100 in front of one or more computing devices such that any external devices may communicate directly with the specialized hardware.

As discussed above, using augmented reality-based systems and methods for decrypting an encrypted code can help to prevent unauthorized persons from viewing a user's sensitive information. The following discussion describes several techniques for selectively decrypting an encrypted code using an augmented reality device to allow a user to better shield sensitive information from others.

Figure 3:
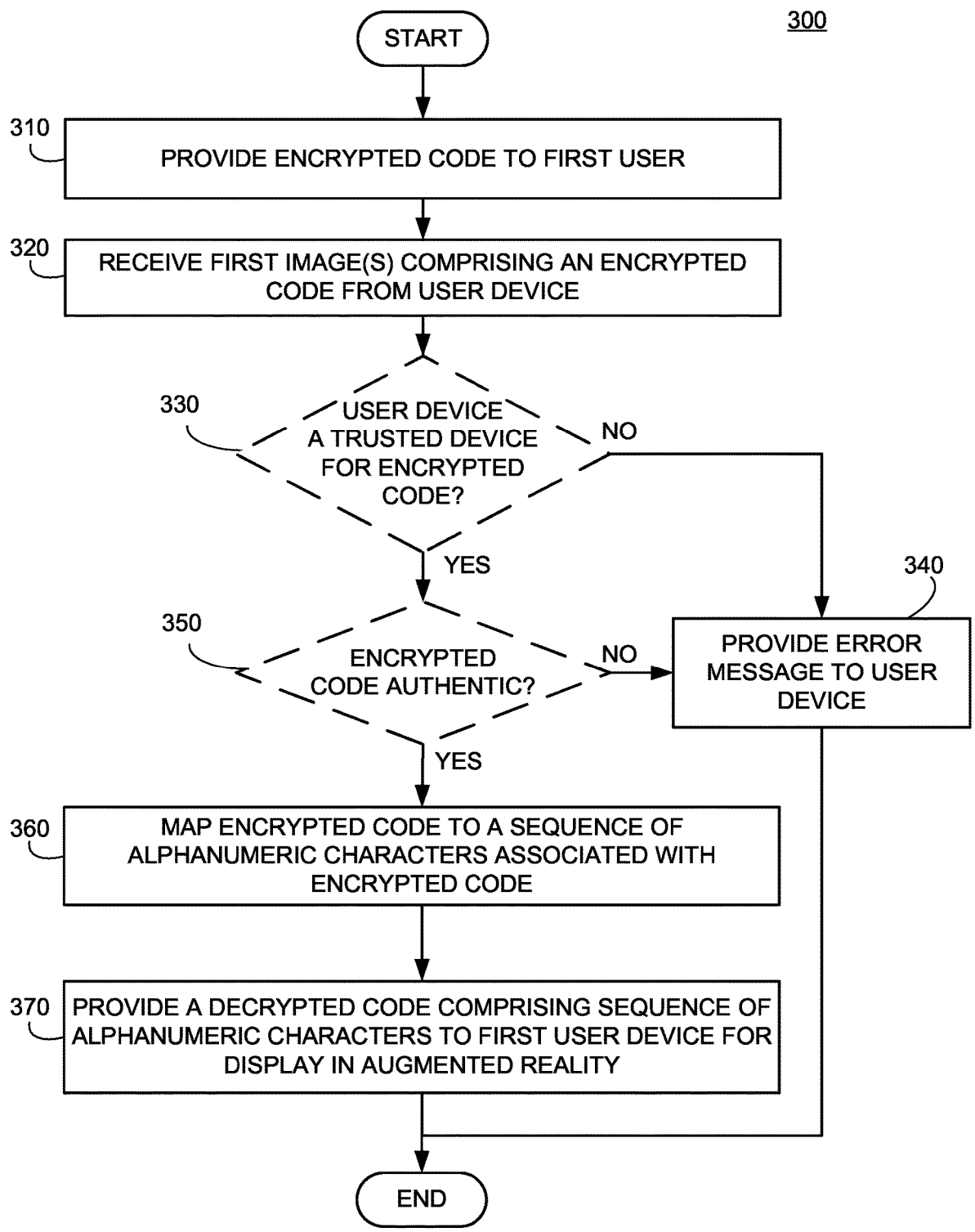
FIG. 3 is a flowchart of an exemplary method for facilitating an augmented reality experience to decrypt an encrypted code in accordance with some embodiments.

FIG. 3 provides a flow chart of an exemplary process 300 for selectively decrypting an encrypted code, according to one or more aspects of the disclosure. Some or all of the steps of process 300 may be performed using decryption system 110 and/or one or more other components of system 100 disclosed herein (e.g., merchant system 102, merchant device 120, augmented reality device 130 or 200, and/or non-merchant device 140).

In block 310, the system (e.g., via merchant device 120 or non-merchant device 140, which may be acting as directed by decryption system 110) may provide an encrypted code to a first user. Merchant device 120 (or similarly non-merchant device 140) may be configured to provide an encrypted code, which may be or include a QR code or other non-human readable code, in the form of a static display, e.g., a fixed image. Alternatively, for added security, merchant device 120 (or similarly non-merchant device 140) may be configured to provide an encrypted code in the form of a dynamic display, e.g., a series of still images or video. For example, an encrypted code, such as a QR code, may be displayed in four separate segments, each segment corresponding to a separate quadrant of the QR code or a separate layer of a multi-layered QR code. Each quadrant or layer of the QR code may be displayed over time (e.g., one quadrant each half second), thus requiring a user device to capture all four quadrants of the QR code. This type of dynamically displayed encrypted code provides a benefit of added security by making it much more difficult for unauthorized users to be able to capture the full series of images.

In some embodiments, merchant device 120 (or similarly non-merchant device 140) may provide an encrypted code based on real-time updates. For example, merchant device 120 may be configured to provide an encrypted code based on real-time user account information (e.g., account balance).

In some embodiments where merchant device 120 (or similarly non-merchant device 140) is a shared device (e.g., multiple family members may access sensitive information from a shared family laptop computer), it may provide an encrypted code based on the user that it is providing an encrypted code to. To accomplish this, merchant device 120 (or similarly non-merchant device 140) may be configured to determine which user is using the device, for example, by recognizing unique login accounts, by detecting which user's mobile device (e.g., smart phone) is proximate the device, and the like. Upon determining which user is using the shared device, merchant device 120 (or similarly non-merchant device 140) may then be configured to provide an encrypted code to shield certain sensitive information. For example, upon determining which user is accessing a family's shared online store account, merchant device 120 (or similarly non-merchant device 140) may be configured to provide an encrypted code in place of each product name to help ensure each family member may maintain his or her privacy with respect to products being ordered.

In some embodiments, providing an encrypted code to a first user may include decryption system 110 directing a printer, acting as merchant device 120 or non-merchant device 140, proximate the first user to print the encrypted code on a physical printout (e.g., paper receipt). This step may involve directing the printer to include a printer steganography pattern associated with the printer on the physical printout. As later described with respect to FIG. 5, the printer steganography pattern may allow decryption system 110 to identify the authenticity of the encrypted code. In other embodiments, providing an encrypted code to a first user may include decryption system 110 providing the encrypted code to merchant device 120, such as a merchant point-of-sale ("POS") device (e.g., terminal display screen, ATM, etc.). Providing the encrypted code to a merchant POS device may include directing the merchant POS to display a steganography pattern associated with the merchant POS device. As later described with respect to FIG. 5, displaying a steganography pattern (even if non-human readable) associated with the merchant POS device may allow decryption system 110 to identify the authenticity of the encrypted code. In other embodiments, decryption system 110 may provide the encrypted code to an electronic display (e.g., laptop screen, mobile application, web browser, etc.) acting as non-merchant device 140. Again, this may include directing the electronic display to display a steganography pattern associated with the electronic display, which can in turn be used to authenticate the encrypted code as later described with respect to FIG. 5.

In some embodiments, the system (e.g., via decryption system 110) may be configured to provide the encrypted code based on user location, for example based on a GPS signal provided by augmented reality device 130 or other user information, such as places and routes frequented by the first user. In this sense, the system may identify which printer is most proximate the first user wearing augmented reality device 130 such that it can direct the appropriate printer to print a receipt with the encrypted code. Similarly, the system may recognize locations where the first user frequently accesses sensitive information, e.g., ATM locations, merchant POS terminals, coffee shops, etc. and store a shortlist of merchant device(s) 120 and/or non-merchant device(s) 140 from those frequently accessed locations and/or based on user preferences. Then in determining which merchant device(s) 120 and/or non-merchant device(s) 140 to provide the encrypted code to the first user with, the system may quickly select an appropriate device from the shortlist if the GPS signal or user feedback confirms that the first user is at a corresponding location.

Regardless of how the encrypted code is provided to the first user at block 310, in block 320, decryption system 110 may receive one or more first images including the provided encrypted code from a user device (e.g., augmented reality device 130). The one or more first images may be or include a single image (e.g., photo) or a series of images (e.g., multiple images or video). The user device may be an augmented reality-based device, such as augmented reality glasses, an augmented reality-based mobile application on a smart phone, and the like. For example, a first user may be wearing augmented reality glasses when viewing encrypted information on a laptop display. When the first user looks in the direction of an encrypted code, thereby taking an image capture of the code, the augmented reality glasses may send them to decryption system 110 which, in turn, receives one or more first images of the encrypted code.

Figure 4:
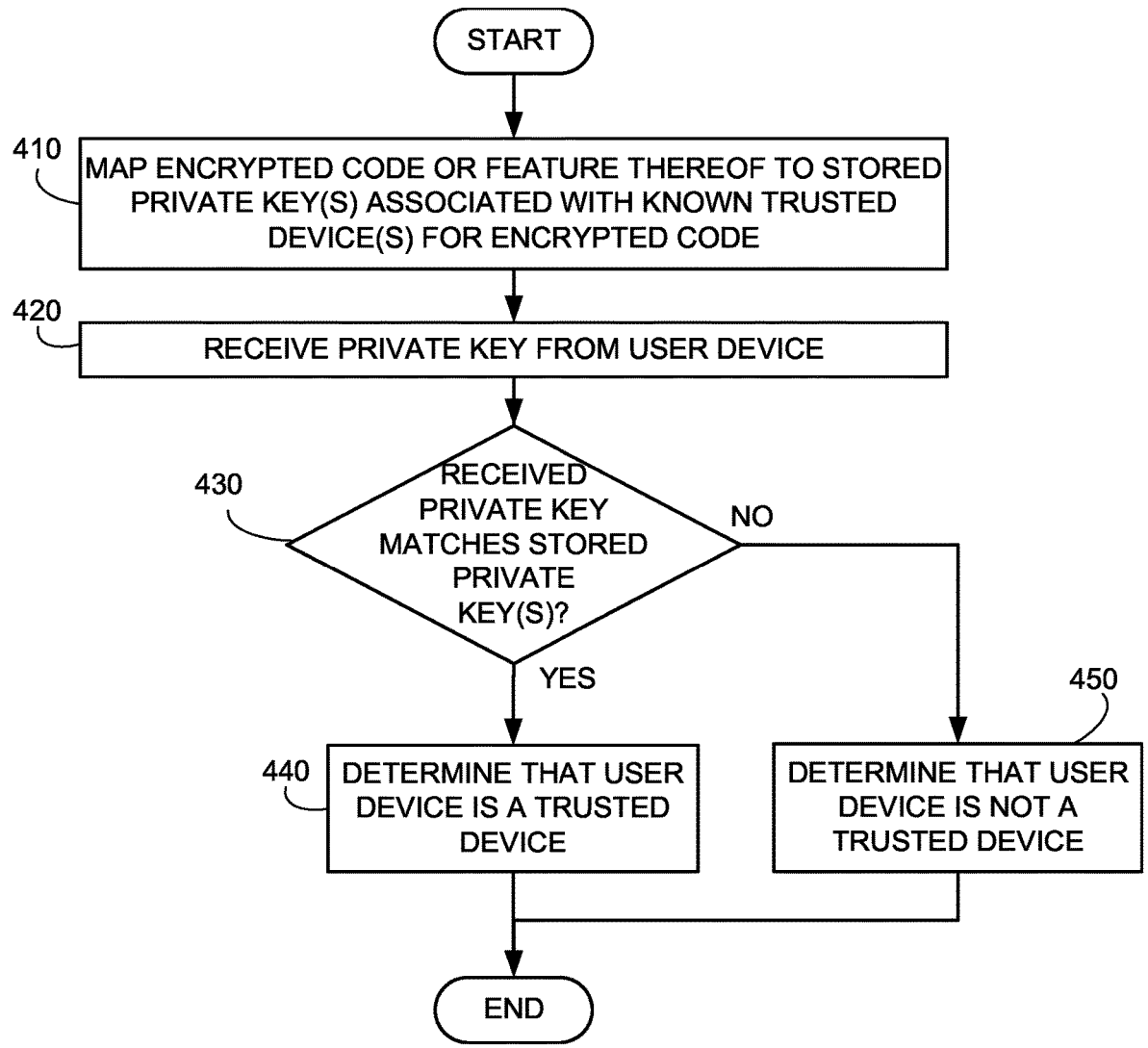
FIG. 4 is a flowchart of an exemplary method for determining whether a user device is a trusted user device for an encrypted code in accordance with some embodiments.

In block 330, decryption system 110 may be configured to determine whether the user device is a trusted device for the provided encrypted code. FIG. 4 provides an exemplary method for determining whether a user device is a trusted user device for an encrypted code by exchanging private keys or other secret credentials between an authorized user device and decryption system 110, though other authentication methods (e.g., those involving symmetric-key cryptography where both the user device and decryption system 110 have cryptographic keys for encryption of plaintext and decryption of ciphertext, or asymmetric cryptography where a public key is used to encrypt a message that can only be decrypted with the recipient's private key) are also contemplated.

As previously discussed, a user must have initially registered a user device with a merchant or entity before being able to use that device to access a specific user account. The merchant or entity affiliated with the user account must be able to ensure the user device is a trusted user device to access information contained in that account. As such, in block 410 of FIG. 4, decryption system 110, after receiving one or more first images comprising an encrypted code from a user device, may be configured to map the encrypted code, or a feature thereof, to a stored credential, such as a private key, associated with one or more trusted user devices for the encrypted code. For example, decryption system 110 may be configured to parse any information included in the encrypted code (e.g., numbers, symbols, etc.), and to then compare the parsed information to information pertaining to the first user device stored in a relational database (e.g., database 114).

In block 420, decryption system 110 may be configured to receive a private key from a user device. For example, decryption system 110 may be configured to detect a unique feature of the user device (e.g., IP address) or embedded in the one or more first images (e.g., in any header information included with the one or more first images).

In block 430, decryption system 110 may be configured to then determine whether the received private key matches one or more stored private keys. For example, decryption system 110 may be configured to detect similarities between the parsed information and the stored information to determine whether a match exists. A match may be deemed to exist when decryption system 110 detects that at least a certain percentage (e.g., 75%, 80%, 85%, etc.) of overlap exists between the parsed and stored information.

If decryption system 110 determines the received private key does not match one or more stored private keys, block 450 provides decryption system 110 may then be configured to determine the user device is not a trusted user device.

Alternatively, if decryption system 110 determines the received private key does match one or more stored private keys, block 440 provides decryption system 110 may then be configured to determine the user device is a trusted user device.

Turning back to FIG. 3, if decryption system 110 determines the user device is not a trusted device, decryption system 110 may be configured to provide an error message to the user device, as illustrated in block 340. Decryption system 110 may be configured to direct the user device (e.g., augmented reality device 130) to display the error message in augmented reality proximate the encrypted code such that the error message is only viewable when the user device is simultaneously capturing one or more images of the encrypted code. Alternatively, decryption system 110 may be configured to direct the user device (e.g., augmented reality device 130) to display the error message in augmented reality proximate the encrypted code such that the error message is viewable even when the user device is no longer capturing one or more images of the encrypted code. In some embodiments, upon determining the user device is not a trusted user device, decryption system 110 may be configured to provide the user device with an opportunity for secondary or backup registration or authentication. In such case, the user device may be able to register as a trusted device to then re-start the decryption process.

Figure 5:
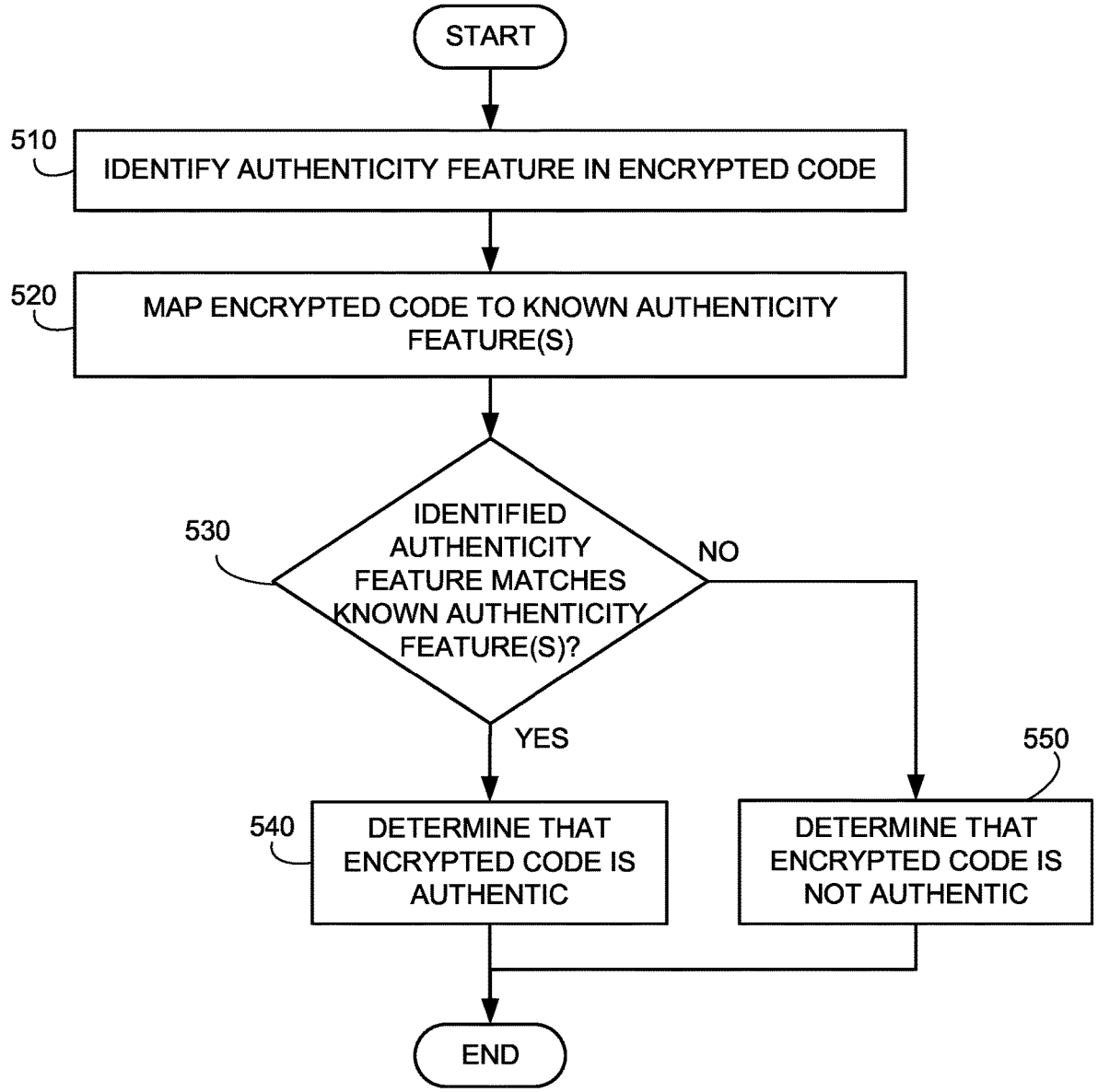
FIG. 5 is a flowchart of an exemplary method for determining the authenticity of an encrypted code in accordance with some embodiments.

Alternatively, if decryption system 110 determines the user device is a trusted device, decryption system 110 may be configured to determine whether the received encrypted code is an authentic code, as illustrated in block 350. FIG. 5 provides an exemplary method for determining the authenticity of an encrypted code.

As previously discussed with respect to block 310 of FIG. 3, merchant device 120 or non-merchant device 140, which may be operating at the direction of decryption system 110, may be configured to provide an encrypted code along with an authenticity feature, for example, a QR code along with a machine-readable microdot including a public key, a QR code including a steganography pattern uniquely associated with the code, and the like. As such, in block 510 of FIG. 5, decryption system 110 may be configured to identify one or more authenticity features in a provided encrypted code. For example, after receiving an encrypted code via a physical printout, decryption system 110 may be configured to identify a printer steganography pattern associated with the printer that generated the physical printout. In another example, after receiving an encrypted code via a merchant POS, decryption system 110 may be configured to identify a merchant POS steganography pattern associated with the merchant POS. Decryption system 110 may then be configured to store any such identified authenticity features in a relational database (e.g., database 114).

In block 520, decryption system 110 may be configured to map the encrypted code to one or more known authenticity features. For example, decryption system 110 may be configured to parse any authenticity features included in the encrypted code (e.g., numbers, symbols, etc.), and to then compare the parsed authenticity features to stored authenticity features associated with the encrypted code.

In block 530, decryption system 110 may then be configured to determine whether the identified authenticity feature of an encrypted code matches a known authenticity feature associated with the encrypted code. For example, decryption system 110 may be configured to detect similarities between the parsed authenticity features and the stored authenticity features to determine whether a match exists. A match may be deemed to exist when decryption system 110 detects that at least a certain percentage (e.g., 75%, 80%, 85%, etc.) of overlap exists between the parsed and stored authenticity features.

If decryption system 110 determines the identified authenticity feature of an encrypted code does not match a known authenticity feature associated with the encrypted code, block 550 provides decryption system 110 may then be configured to determine the encryption code is not an authentic code.

Alternatively, if decryption system 110 determines the identified authenticity feature of an encrypted code does match a known authenticity feature associated with the encrypted code, block 540 provides decryption system 110 may then be configured to determine the encryption code is an authentic code.

Turning back to FIG. 3, if decryption system 110 determines the encrypted code is not an authentic code, decryption system 110 may be configured to provide an error message to the user device, as previously described in block 340.

Alternatively, if decryption system 110 determines the encrypted code is an authentic code, decryption system 110 may be configured to map the encrypted code to a first sequence of alphanumeric characters associated with the encrypted code, as illustrated in block 360. For example, decryption system 110 may be configured to parse any information included in the encrypted code (e.g., numbers, letters, symbols, etc.) in order to match the encrypted code with the specific sensitive information the encrypted code is hiding (e.g., a user's full name, address, account number, etc.).

In block 370, decryption system 110 may then be configured to provide a first decrypted code including the first sequence of alphanumeric characters to the user device for display in augmented reality. Decryption system 110 may be configured to provide the first decrypted code to the user device via a visual output (e.g., electronic display screen), an audio output (e.g., speakers), or an audiovisual output (e.g., both electronic display screen and speakers). Decryption system 110 may be configured to provide such one or more output options automatically, based on user input, or based on pre-stored user preferences. For example, a user may wish to receive the decrypted code in one or more output forms if the user is, for example, hearing or sight impaired, or in a location where the user's ability to hear or read the decrypted code may be limited. Decryption system 110 may be configured to provide the first decrypted code to the user device for display in a particular color (e.g., green when the encrypted code is determined to be authentic, red when the encrypted code is determined to be not authentic, and black as a default when the encrypted code has not been determined to be authentic or not) and/or with an audible sound based on the determination of whether the encrypted code is authentic.

In some embodiments, decryption system 110 may be configured to provide the decrypted code proximate the encrypted code when the user device is simultaneously capturing one or more second images comprising the encrypted code. For example, a user may first capture an encrypted code on an electronic display using an augmented reality-based application on his or her mobile phone. Decryption system 110 may then be configured to provide the decrypted code proximate the encrypted code when decryption system 110 recognizes the user is still holding the mobile phone over the encrypted code (i.e., taking one or more second images of the encrypted code) to continue viewing the decrypted code. In such embodiments where decryption system 110 is configured to provide the first decrypted code via a visual output or audiovisual output, the user may see the decrypted code displayed proximate the encrypted code when the user device is simultaneously capturing the one or more second images comprising the second code. In other such embodiments where decryption system 110 is configured to provide the first decrypted code via an audio output or an audiovisual output, the user may hear the decrypted code when the user device is simultaneously capturing the one or more second images comprising the second code.

In some embodiments, decryption system 110 may be configured to receive one or more third images including the encrypted code from a user device (the same user device as earlier in method 300 or another user device), and to provide a decrypted code comprising a second sequence of alphanumeric characters to the user device for display in augmented reality. For example, decryption system 110 may first receive one or more first images including the encrypted code from a user device, and use the first image(s) to authenticate the user device, if appropriate, and to decrypt the encrypted code. Decryption system 110 may provide a first decrypted code, e.g., a user's account balance, as it receives one or more second images from the user device. That is, for example, after decrypting the encrypted code, decryption system 110 may wait to display a first decrypted code until the user is again looking at the encrypted code and, in turn, the user device is capturing and sending additional image(s) of the encrypted code to decryption system 110). Later on, decryption system 110 may receive one or more third images including the same encrypted code from the user device. For example, these additional images may come from the same user device hours after the prior exchange or from a second user device. Regardless, these additional images contain the same encrypted code. Decryption system 110 may follow one or more of the same or similar step(s) to again decrypt the encrypted code and provide a second decrypted code, e.g., the user's updated account balance. Decryption system 110 may be configured to repeat this process indefinitely, that is, to receive successive images comprising an encrypted code from a user device and to provide an updated decrypted code with each successive image. In this manner, a user may receive an initial (and at the time current) account balance based on a QR code printed on a receipt at an ATM, conduct subsequent transactions that alter his or her account balance, and receive an updated account balance based on the same QR code printed on the receipt. In other embodiments, the system may not require that the user is actively looking at the encrypted code and instead store recently captured images for later use. In this manner, a user may use the system to see or hear an updated account balance even after throwing away the printed receipt because an image of the QR code on the receipt is stored by the system.

Depending on whether decryption system 110 is configured to provide the decrypted code via a visual, audio, or audiovisual output, as discussed above, the decrypted code can be displayed in several ways, which may take into account user preferences and/or a content type of the decrypted code. For example, in some embodiments where decryption system 110 is configured to provide the decrypted code via a visual or audiovisual output, decryption system 110 may be configured to provide the decrypted code including transaction-related information and account-related information in separate regions of the decrypted code, for example, in separate areas on an electronic display or printed receipt. The display of transaction-related information and account-related information in separate regions may take into account user preferences, which may be provided to decryption system 110 via a user device (e.g., augmented reality device 130). In other such embodiments, decryption system 110 may be configured to provide the decrypted code completely overlaying the encrypted code such that, in augmented reality, the user sees the decrypted code in place of the encrypted code that a bystander would see. In yet other such embodiments, decryption system 110 may be configured to provide the decrypted code only partially overlaying the encrypted code or offset from the encrypted code such that, in augmented reality, the user sees the decrypted code proximate the encrypted code's location relative to other non-encrypted content on the display or printout but can also see at least a portion of the encrypted code as confirmation that the system has decrypted the encrypted code.

Regardless of the location of the decrypted code relative to the encrypted code, decryption system 110 may provide the decrypted code in a manner such that it stands out to the user in augmented reality and the user has feedback about what bystanders might be able to see. For example, if the encrypted code on a receipt or display in shown in black, decryption system 110 (or the user device, e.g., augmented reality device 130, which may be working at the direction of decryption system 110) may initially identify and virtually display the encrypted code in red to indicate to the user that it is an encrypted code, then virtually display the decrypted code in a new color (e.g., green) to indicate to the user that the decrypted code has been decrypted and is not viewable to bystanders. Such color coding or other identifiers may provide user feedback without requiring that the system display at least a portion of the encrypted code, thereby allowing for display of the decrypted code in the exact position of the encrypted code relative to its surrounding real-world content on the printout or display, which may improve aesthetics or user comprehension of the printout or display as a whole.

In other example embodiments where decryption system 110 is configured to provide the decrypted code via an audio or audiovisual output, decryption system 110 may be configured to provide different types of information included in the decrypted code in a certain order based on, for example, user preferences. For example, a user may wish to hear transaction-related information prior to hearing account-related information, or vice versa. As discussed above with respect to providing visual displays of the decrypted code in a manner that stands out to the user in augmented reality, providing audio displays of the decrypted code may also be provided in a manner such that the decrypted code stands out. For example, decryption system 110 may be configured to output a certain sound (e.g., an alarm or chime) prior to outputting the decrypted code such that the user better recognizes that he or she is about to hear the decrypted code.

From a user experience perspective, FIGS. 6A-6D provide examples of what a user may expect to see when the disclosed systems decrypt an encrypted code using an augmented reality device and provide the decrypted code in visual form.

Figure 6A:
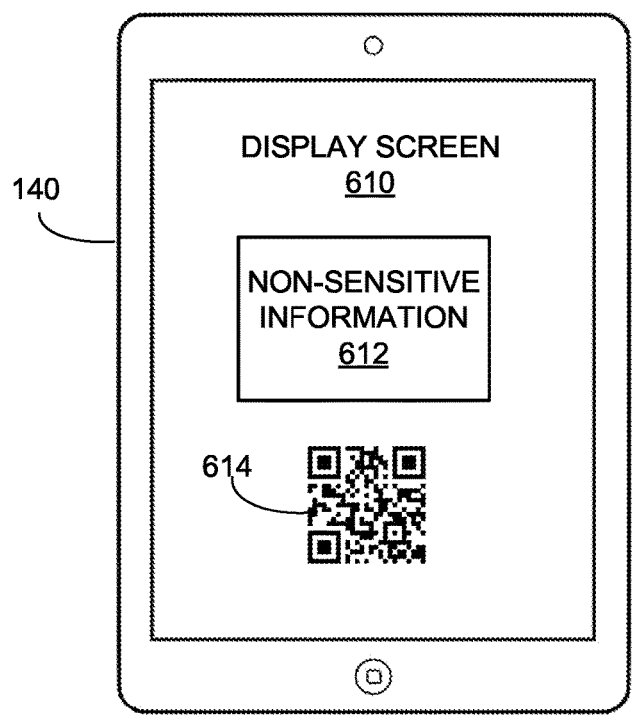
FIGS. 6A and 6B illustrate examples of how an encrypted code can be used to hide sensitive information on either an electronic display screen (6A) or a physical printout (6B)

In FIG. 6A, non-merchant device 140 (e.g., a tablet computer) includes an electronic display screen 610 showing both non-sensitive information 612 and a QR code 614 representing sensitive information. This type of information display may be helpful especially for a first-time user to understand what information is sensitive versus non-sensitive, that is, what information only the user should be viewing.

Figure 6B:
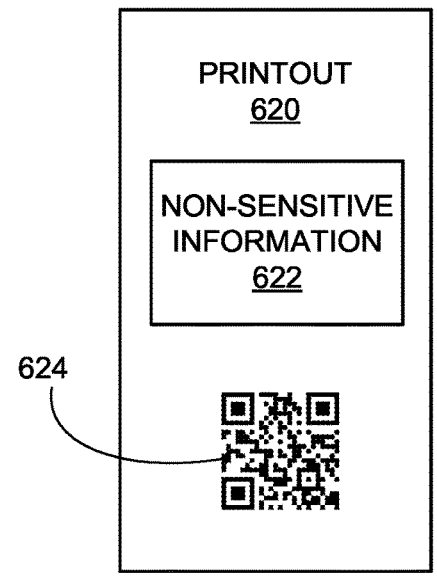

Alternatively, FIG. 6B illustrates how similar information (non-sensitive information 622 and a QR code 624 representing sensitive information) may appear on a physical printout 620. That is, non-sensitive information 622 found on printout 620 is displayed normally. On the other hand, however, sensitive information is hidden behind an encrypted code, such as QR code 624.

Figure 6C:
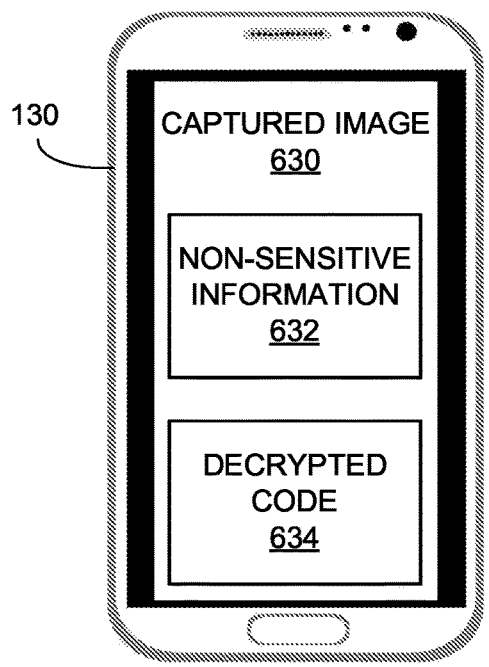
FIGS. 6C and 6D illustrate examples of how an augmented reality device can display a decrypted code either overlaying (6C) or partially overlaying (6D) an encrypted code.

In FIG. 6C, augmented reality device 130 (e.g., a mobile smart phone) displays a captured image 630. Captured image 630 may have been captured off a display, such as a display from merchant device 120 or non-merchant device 140 (e.g., FIG. 6A), or a physical printout (e.g., FIG. 6B). Augmented reality device 130 displays non-sensitive information 632 normally and reveals sensitive information via a decrypted code 634. In this example, decrypted code 634 is completely overlaying an encrypted code (e.g., QR code 614 or 624).

Figure 6D:
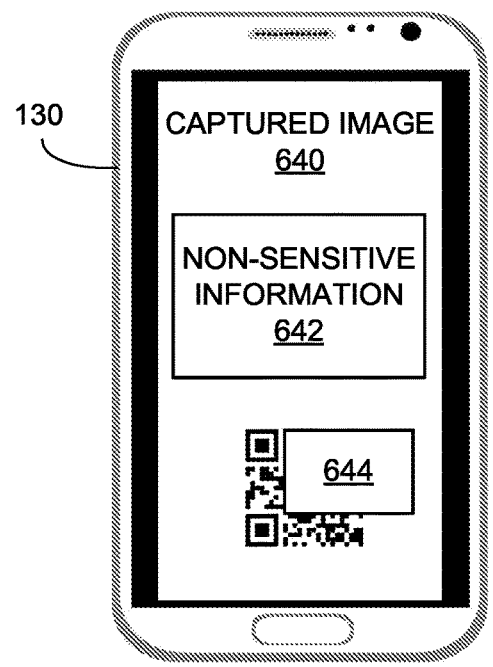

In FIG. 6D, augmented reality device 130 (e.g. a mobile smart phone) displays captured image 640. Captured image 640 may have been captured off a display, such as a display from merchant device 120 or non-merchant device 140 (e.g., FIG. 6A), or a physical printout (e.g., FIG. 6B). Augmented reality device 130 displays non-sensitive information 642 normally and reveals sensitive information via a decrypted code 644. In this example, decrypted code 644 is only partially overlaying an encrypted code (e.g., QR code 614 or 624).

Exemplary Use Cases

The following exemplary use cases describe examples of a typical user flow pattern. They are intended solely for explanatory purposes and not to limit the disclosure in any way.

In one exemplary use case, a user may be equipped with a device that can generate an augmented reality display (e.g., augmented reality device 130). The user may wish to access and view sensitive information on an electronic display screen in a public area, for example, on a personal laptop (e.g., non-merchant device 140) while sitting in a coffee shop. As the user navigates on the laptop to a merchant's web page, the system (e.g., merchant system 102 or a component thereof, such as decryption system 110) may detect that the user is logging into a personal account and automatically encrypt certain sensitive information (e.g., user's full name, address, social security number, etc.), or the sensitive information may have already been encrypted as a default. The type of information that may be encrypted and the timing at which encryption occurs (e.g., at the time of login, after the account page has been open for a length of time, etc.) may be based on stored user preferences (e.g., in database 114). Regardless of when encryption occurs, the system may provide an encrypted code on the laptop screen in place of sensitive information, such as a QR code in place of a medical test result. In order to view the user's test result in a discreet fashion, making it difficult for others in the coffee shop to easily view the information, the user may use his or her augmented reality device, for example, an augmented reality-based application on his or her mobile smart phone. The user may hold the smart phone up to the laptop screen, pointing the smart phone's image capturing device (e.g., a camera) toward an encrypted code. Unbeknownst to the user, the smart phone may capture and send multiple images or sets of images of the encrypted code to the system (e.g., decryption system 110), who authenticates the smart phone if applicable, maps the encrypted code to the user's test result, and directs the smart phone to displays the test result as virtual content at least partially overlaying the QR code. To give the user some feedback on this process, and to indicate that the test result is not viewable outside of the smart phone, the system may direct the smart phone to display the black QR code in red for 0.5 seconds or another preset time interval to flag it as an encrypted code, and then to display the test result in green overlaying the QR code for 0.5 seconds to indicate confirmation that the QR code was decrypted as the decrypted code, before ultimately displaying the test information in black in place of the QR code. The user may then view his or her medical test result in augmented reality on the smart phone screen. The smart phone may display the test result for an extended time regardless of where its image capture device is pointed or, in other embodiments, only while it continues to provide images of the QR code to the system for added security. By providing an encrypted code displayed on the laptop screen in place of the medical test result, the user can ensure this sensitive information cannot be easily viewed by others in the coffee shop who may glance at the user's laptop, but would have more difficulty reading a smaller screen that is closer to the user, such as the smart phone. Further, by only allowing for decryption of the encrypted code using the user's mobile smart phone, the system provides security and privacy benefits by requiring two screens. Having to look at both the mobile smart phone screen and the laptop screen makes the sensitive information that much more difficult for unauthorized users to view from afar. Finally, by providing options for the type of information that may be encrypted and the timing at which encryption occurs, the user can be better prepared to protect his or her sensitive information, for example, by selecting the most appropriate place to sit in the coffee shop, by selecting the safest angle to point the mobile device toward the laptop screen, etc.

In another exemplary use case, a user may be equipped with a device that can generate an augmented reality display (e.g., augmented reality device 130). The user may wish to access and view sensitive information on an electronic display screen in a public area, for example, at an ATM (e.g., merchant device 120) while others stand in line behind the user. As the user approaches the ATM, the system (e.g., merchant system 102) may detect a GPS signal provided by the user's augmented reality-based device to recognize that the user frequents this specific ATM location. The system may then automatically begin to encrypt any sensitive information that may be shown on the ATM display once the user logs into his or her account (e.g., user's full name, account number, account balance, etc.). Alternatively, as the user enters his or her credentials into the ATM (e.g., account pin number), the system may detect that the user is accessing a personal account and may then begin to automatically encrypt certain sensitive information. The type of information that may be encrypted and the timing at which encryption occurs (e.g., the user approaching the ATM, the user responding to a prompt when logging into the ATM, after the account screen has been open for a length of time, etc.) may be based on stored user preferences (e.g., in database 114). The system may then provide an encrypted code on the ATM screen in place of sensitive information, such as a QR code in place of an account balance. In order to view the user's account balance in a discreet fashion, ensuring that others standing in line at the ATM cannot easily view the information, the user may use his or her augmented reality device, for example, augmented reality glasses. The user may put the glasses on and look toward the ATM screen, specifically toward an encrypted code. Again, unbeknownst to the user (outside of the previously discussed user feedback), the system may decrypt the encrypted code and ultimately provide the decrypted code with the user's account balance ($100) to the user. The user may then view his or her account balance in augmented reality through the glasses. Subsequently, either if an image of the QR code is stored on the augmented reality glasses or the user looks at the QR code later using the augmented reality glasses, the system may again decrypt the encrypted code and ultimately provide an updated account balance ($50) to the user, such that the QR code represents real-time sensitive information rather than a timestamp upon printout. In some embodiments, a second user who is an authorized user of the same account may use her own augmented reality glasses to decrypt the same QR code and view information for her sub-totaled account balance ($25) within the account. By providing an encrypted code displayed on the ATM screen in place of the user's account balance, the user can ensure this sensitive information cannot be easily viewed by others standing in line behind the user at the ATM. Further, by only allowing for decryption of the encrypted code using the user's augmented reality glasses, the system provides significant security and privacy benefits in that only the person wearing the glasses may view the sensitive information. Finally, by providing options for the type of information that may be encrypted and the timing at which encryption occurs, the user can be better prepared to protect his or her sensitive information, for example, by knowing at what point to put the augmented reality glasses on, by selecting the safest position to stand facing the ATM, etc.

In another exemplary use case, a user may be equipped with a device that can generate an augmented reality display (e.g., augmented reality device 130). The user may wish to access and view sensitive information on a physical printout in a public area, for example, on a paper receipt while standing in a store. The system (e.g., merchant system 102) may detect that user sensitive information is included and will be displayed on the printed receipt. The system may thus automatically encrypt certain sensitive information (e.g., user's full name, account number, product names, etc.). The type of information that may be encrypted and the timing at which encryption occurs (e.g., when the system detects printing begins) may be based on stored user preferences (e.g., in database 114). The system may then provide an encrypted code on the paper receipt in place of sensitive information, such as a QR code in place of a product name. In order to view the product name in a discreet fashion, ensuring that others standing in the store cannot easily view the information, the user may use his or her augmented reality device, for example, an augmented reality-based application on a mobile tablet. The user may hold the tablet over the receipt, pointing the tablet's image capturing device (e.g., a camera) toward an encrypted code. Again, unbeknownst to the user (outside of the previously discussed user feedback), the system may decrypt the encrypted code and ultimately provide the decrypted code with the product name to the user. The user may then view the product name in augmented reality on the tablet screen. By providing an encrypted code displayed on the printed receipt in place of the product name, the user can ensure this sensitive information cannot be easily viewed by others in the store who may be standing in line behind the user or glance over the user's shoulder. Further, by only allowing for decryption of the encrypted code using the user's tablet, the system provides security and privacy benefits by requiring two mediums. Having to look at both the tablet screen and the printed receipt makes the sensitive information that much more difficult for unauthorized users to view from afar. Finally, by providing options for the type of information that may be encrypted and the timing at which encryption occurs, the user can be better prepared to protect his or her sensitive information, for example, by selecting the most appropriate place to view the information (e.g., inside or outside of the store, in the user's car, etc.), by selecting the safest angle to point the tablet toward the printed receipt, etc.

The disclosed embodiments are directed to augmented reality-based systems and methods for decrypting an encrypted code. Consistent with the disclosed embodiments, a system for selectively decrypting an encrypted message encrypted by an encryption system may include one or more processors and a memory in communication with the one or more processors and storing instructions, that when executed by the one or more processors, are configured to cause the decryption system to perform a method. The system may provide an encrypted code to a first user. The system may then receive one or more first images including the encrypted code from a first user device associated with the first user. The system may determine whether the first user device is a trusted device for the encrypted code. Responsive to determining that the first user device is a trusted device, the system may map the encrypted code to a first sequence of alphanumeric characters associated with the encrypted code. The system may then provide a first decrypted code including the first sequence of alphanumeric characters to the first user device for display in augmented reality proximate the encrypted code such that the first decrypted code is only viewable on the first user device when the first user device is simultaneously capturing one or more second images including the encrypted code.

In another aspect, a method for selectively decrypting an encrypted code displayed on a first computing device to reveal sensitive information associated with the encrypted code is disclosed. The disclosed method may include providing an encrypted code including a first non-human readable symbol in place of sensitive information for display on the first computing device viewable by a user. The method may include receiving one or more images including the encrypted code from a second computing device associated with the user. The method may include determining whether the second computing device is a trusted device for the sensitive information. Responsive to determining that the second computing device is a trusted device, the method may include mapping the first non-human readable symbol to a first sequence of alphanumeric characters associated with the sensitive information. The method may include providing a decrypted code including the first sequence of alphanumeric characters to the second computing device for display when the second computing device is capturing one or more images of the encrypted code simultaneously displayed on the first computing device to form an augmented reality display.

In another aspect, a method for selectively decrypting an encrypted code on a printout to reveal sensitive information associated with the encrypted code is disclosed. The disclosed method may include receiving one or more images of the printout having an encrypted code including a first non-human readable symbol in place of sensitive information from a user device associated with a user. The method may include determining whether the user device is a trusted device for the sensitive information. Responsive to determining that the user device is a trusted device, the method may include mapping the first non-human readable symbol to a first sequence of alphanumeric characters associated with the sensitive information. The method may include providing a decrypted code including the first sequence of alphanumeric characters to the user device for display when the user device is capturing one or more images of the encrypted code on the printout to form an augmented reality display.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like, that perform particular tasks or implement particular abstract data types when executed by a processor in a computer or other device. The modules may be written in a source code programming language that is subsequently compiled for execution or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although certain specific aspects of various example embodiments have been described, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. Thus, embodiments disclosed should be considered in all respects as examples and not restrictive. Accordingly, the scope of the inventions herein should be determined not by the embodiments illustrated, but by the appended claims and their equivalents.

In the present description, numerous specific details are set forth. However, it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Unless otherwise noted, the terms used herein are to be understood according to conventional usage by those of ordinary skill in the relevant art. In addition to any definitions of terms provided below, it is to be understood that as used in the specification and in the claims, "a" or "an" can mean one or more, depending upon the context in which it is used. Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Also, in describing example embodiments, certain terminology is used for the sake of clarity. It is intended that each term contemplates its broadest meaning as understood by those skilled in the art and includes all technical equivalents that operate in a similar manner to accomplish a similar purpose.

While certain embodiments of the disclosed technology have been described, it is to be understood that the disclosed technology is not to be limited to the disclosed example embodiments, but covers various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and to enable any person skilled in the art to practice the disclosed technology, including making and using any devices or systems and performing any incorporated methods. The patentable scope may include other examples that occur to those skilled in the art. Such other examples are intended to be within the scope of the claims if they have structural elements as the claims, or if they include equivalent structural elements with insubstantial differences from the literal language of the claims.

What is claimed is:

1. A decryption system for selectively decrypting and enabling an augmented reality device to display an encrypted message encrypted by an encryption system, the decryption system comprising:
   one or more processors; and
   a memory in communication with the one or more processors and storing instructions, that when executed by the one or more processors, are configured to cause the decryption system to:
      provide the encrypted message to a first user;
      receive, from a first augmented reality device associated with the first user, one or more first images comprising the encrypted message;
      determine whether the first augmented reality device is a trusted device for the encrypted message; and responsive to determining that the first augmented reality device is a trusted device:
  decrypt the encrypted message to reveal a first decrypted message comprising a first sequence of alphanumeric characters associated with the encrypted message; and
  transmit the first decrypted message comprising the first sequence of alphanumeric characters to the first augmented reality device that displays the first decrypted message in augmented reality proximate the encrypted message such that the first decrypted message is only viewable on the first augmented reality device when the first augmented reality device is simultaneously capturing one or more second images comprising the encrypted message, wherein the decryption system is separate from the first augmented reality device.

2. The decryption system of claim 1, wherein:
providing the encrypted message to the first user further comprises directing a printer proximate the first user to print the encrypted message on a physical printout; and
the first decrypted message is provided to the first augmented reality device for display in augmented reality such that the first decrypted message is viewable overlaying the encrypted message in the one or more second images of the encrypted message printed on the physical printout.

3. The decryption system of claim 2, wherein:
directing the printer proximate the first user to print the encrypted message on the physical printout further comprises directing the printer to print a printer steganography pattern associated with the printer on the physical printout; and
the instructions, when executed by the one or more processors, are further configured to cause the decryption system to:
  identify the printer steganography pattern in the one or more first images;
  determine whether the physical printout is authentic by comparing the identified printer steganography pattern with a stored printer steganography pattern associated with the printer; and
  provide an authenticity message to the first augmented reality device for display in augmented reality proximate the encrypted message, the authenticity message indicating the authenticity of the physical printout based on the determination of whether the physical printout is authentic.

4. The decryption system of claim 2, wherein:
directing the printer proximate the first user to print the encrypted message on the physical printout further comprises directing the printer to print a printer steganography pattern associated with the printer on the physical printout; and
the instructions, when executed by the one or more processors, are further configured to cause the decryption system to:
  identify the printer steganography pattern in the one or more first images;
  determine whether the physical printout is authentic by comparing the identified printer steganography pattern with a stored printer steganography pattern associated with the printer; and
  direct the first augmented reality device to provide an audible authenticity sound to the first user, the audible authenticity sound indicating the authenticity of the physical printout based on the determination of whether the physical printout is authentic.

5. The decryption system of claim 1, wherein the encrypted message is provided for dynamic display in phased sequence comprising at least a first phase and a second phase, and the one or more first images comprise a first image showing the encrypted message in the first phase and a second image showing the encrypted message in the second phase.

6. The decryption system of claim 1, wherein:
the encrypted message comprises a first non-human readable symbol comprising a first QR code; and
the first decrypted message is provided to the first augmented reality device for display in augmented reality such that the first decrypted message is viewable overlaying the first QR code in the one or more second images.

7. The decryption system of claim 6, wherein the instructions, when executed by the one or more processors, are further configured to cause the decryption system to:
receive, via the first augmented reality device, one or more third images comprising the first QR code; and
responsive to determining that the first augmented reality device is a trusted device:
  decrypt the first QR code to a second decrypted message comprising a second sequence of alphanumeric characters associated with the first QR code, the second sequence of alphanumeric characters differing from the first sequence of alphanumeric characters; and
  provide the second decrypted message comprising the second sequence of alphanumeric characters to the first augmented reality device for display such that the second decrypted message is only viewable on the first augmented reality device when the first augmented reality device is simultaneously capturing one or more fourth images comprising the first QR code.

8. The decryption system of claim 7, wherein the instructions, when executed by the one or more processors, are further configured to cause the decryption system to:
receive, via a second augmented reality device associated with a second user, one or more fifth images comprising the first QR code;
determine whether the second augmented reality device is a trusted device for the first QR code; and
responsive to determining that the second augmented reality device is a trusted device:
  decrypt the first QR code to a third decrypted message comprising a third sequence of alphanumeric characters associated with the first QR code, the third sequence of alphanumeric characters differing from the first and second sequences of alphanumeric characters; and
  provide the third decrypted message comprising the third sequence of alphanumeric characters to the second augmented reality device for display such that the third decrypted message is only viewable on the second augmented reality device when the second augmented reality device is simultaneously capturing one or more sixth images comprising the first QR code.

9. The decryption system of claim 1, wherein the instructions, when executed by the one or more processors, are further configured to cause the decryption system to:

receive, via the first augmented reality device, one or more third images comprising the encrypted message; and responsive to determining that the first augmented reality device is a trusted device:

decrypt the encrypted message to reveal a second decrypted message comprising a second sequence of alphanumeric characters associated with the encrypted message, the second sequence of alphanumeric characters differing from the first sequence of alphanumeric characters; and provide the second decrypted message comprising the second sequence of alphanumeric characters to the first augmented reality device for display such that the second decrypted message is only viewable on the first augmented reality device when the first augmented reality device is simultaneously capturing one or more fourth images comprising the encrypted message.

10. The decryption system of claim 9, wherein the instructions, when executed by the one or more processors, are further configured to cause the decryption system to:

receive, via a second augmented reality device associated with a second user, one or more fifth images comprising the encrypted message;

determine whether the second augmented reality device is a trusted device for the encrypted message; and responsive to determining that the second augmented reality device is a trusted device:

decrypt the encrypted message to reveal a third decrypted message comprising a third sequence of alphanumeric characters associated with a first QR code, the third sequence of alphanumeric characters differing from the first and second sequences of alphanumeric characters; and provide the third decrypted message comprising the third sequence of alphanumeric characters to the second augmented reality device for display such that the third decrypted message is only viewable on the second augmented reality device when the second augmented reality device is simultaneously capturing one or more sixth images comprising the encrypted message.

11. The decryption system of claim 1, wherein the instructions, when executed by the one or more processors, are further configured to cause the decryption system to, responsive to determining that the first augmented reality device is not a trusted device, provide an error message to the first augmented reality device for display in augmented reality proximate the encrypted message such that the error message is only viewable on the first augmented reality device when the first augmented reality device is simultaneously capturing the one or more second images comprising the encrypted message.

12. The decryption system of claim 1, wherein the instructions, when executed by the one or more processors, are further configured to cause the decryption system to provide virtual content along with the first decrypted message to the first augmented reality device for display.

13. The decryption system of claim 12, wherein the virtual content comprises a search bar configured to allow the first user to search one or more records associated with the first user.

14. The decryption system of claim 12, wherein the virtual content comprises a selectable button that, when selected by the first user, is configured to trigger a graphical display associated with the first decrypted message.

15. The decryption system of claim 12, wherein:

providing the encrypted message to the first user further comprises displaying the encrypted message on a first screen viewable to the first user; and the virtual content comprises a selectable button that, when selected by the first user, is configured to cause the first screen to display the first decrypted message in place of the encrypted message.

16. A method for selectively decrypting an encrypted message displayed on a first computing device to reveal a decrypted message associated with the encrypted message, the method comprising:

providing, by a decryption system, the encrypted message comprising a first non-human readable symbol for display on the first computing device viewable by a user;

receiving, by the decryption system from a second computing device associated with the user, one or more images comprising the encrypted message;

determining, by the decryption system, whether the second computing device is a trusted device for the encrypted message; and responsive to determining, by the decryption system, that the second computing device is a trusted device:

decrypting, by the decryption system, the encrypted message to reveal the decrypted message comprising a first sequence of alphanumeric characters associated with the encrypted message; and transmitting, by the decryption system, the decrypted message comprising the first sequence of alphanumeric characters to the second computing device that displays the decrypted message when the second computing device is capturing one or more images of the encrypted message simultaneously displayed on the first computing device to form an augmented reality display, wherein the decryption system is separate from the second computing device.

17. The method of claim 16 further comprising determining whether the encrypted message is authentic, wherein:

the second computing device comprises an augmented reality device; and transmitting the decrypted message to the second computing device for display further comprises altering a default color of the decrypted message to an alternative color based on the determination whether the encrypted message is authentic.

18. The method of claim 17 further comprising causing the second computing device to play an audible sound associated with the decrypted message to the user based on the determination whether the encrypted message is authentic.

19. The method of claim 17 further comprising causing the first computing device to play an audible sound associated with the decrypted message to the user based on the determination whether the encrypted message is authentic.

20. A method for selectively decrypting an encrypted message on a printout to reveal in augmented reality a decrypted message associated with the encrypted message, the method comprising:

providing, by a decryption system, the encrypted message on the printout;

receiving, by the decryption system from an augmented reality device associated with a user, one or more images of the printout having the encrypted message comprising a first non-human readable symbol;

determining, by the decryption system, whether the augmented reality device is a trusted device for the encrypted message; and responsive to determining, by the decryption system, that the augmented reality device is a trusted device:

decrypting, by the decryption system, the encrypted message to reveal the decrypted message comprising a first sequence of alphanumeric characters associated with the encrypted message; and transmitting, by the decryption system, the decrypted message comprising the first sequence of alphanumeric characters to the augmented reality device that displays the decrypted message when the augmented reality device is simultaneously capturing one or more images of the encrypted message on the printout, wherein the decryption system is separate from the augmented reality device.

\* \* \* \* \*